United States Patent [19]
Heinrich, Jr.

[11] 3,747,761
[45] July 24, 1973

[54] CONTINUOUS FLOW SUCTION FILTER

[75] Inventor: Peter Heinrich, Jr., Chicago, Ill.

[73] Assignee: Marvel Engineering Company, Chicago, Ill.

[22] Filed: Nov. 3, 1971

[21] Appl. No.: 195,382

[52] U.S. Cl.............. 210/120, 210/130, 210/172, 210/235
[51] Int. Cl...................... B01d 35/02, B01d 27/10
[58] Field of Search...................... 210/232, 97, 104, 210/90, 169, 130, 120, 133, 137, 258, 282, 406, 416, 432, 242, 448, 436, 437, 167, 235, 172

[56] References Cited
UNITED STATES PATENTS

| | | | |
|---|---|---|---|
| 3,599,792 | 8/1971 | Stripp | 210/130 |
| 3,384,242 | 5/1968 | Kudlaty et al. | 210/436 |
| 3,653,512 | 4/1972 | Brown | 210/130 |

Primary Examiner—Samih N. Zaharna
Assistant Examiner—T. A. Granger
Attorney—Howard T. Markey et al.

[57] ABSTRACT

An in-reservoir suction filter assembly wherein a perforated housing contains a filter element removable from outside the reservoir enabling fluid flow with the element removed, the filter element including a shroud insuring filtration at varying reservoir fluid levels with the element present in the housing. A purge valve releases entrapped air upon element insertion.

15 Claims, 8 Drawing Figures

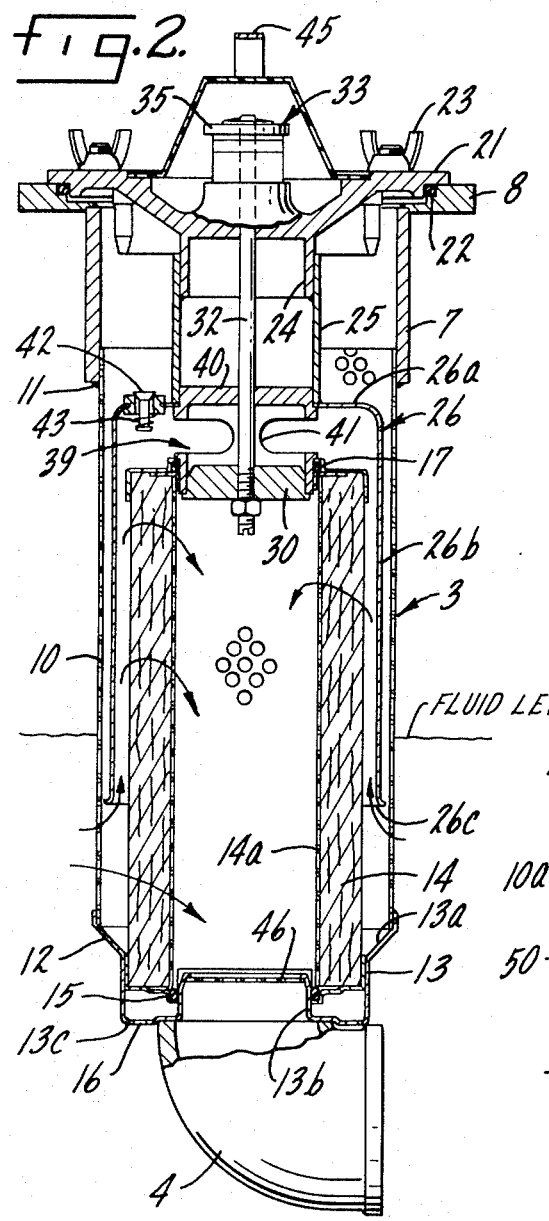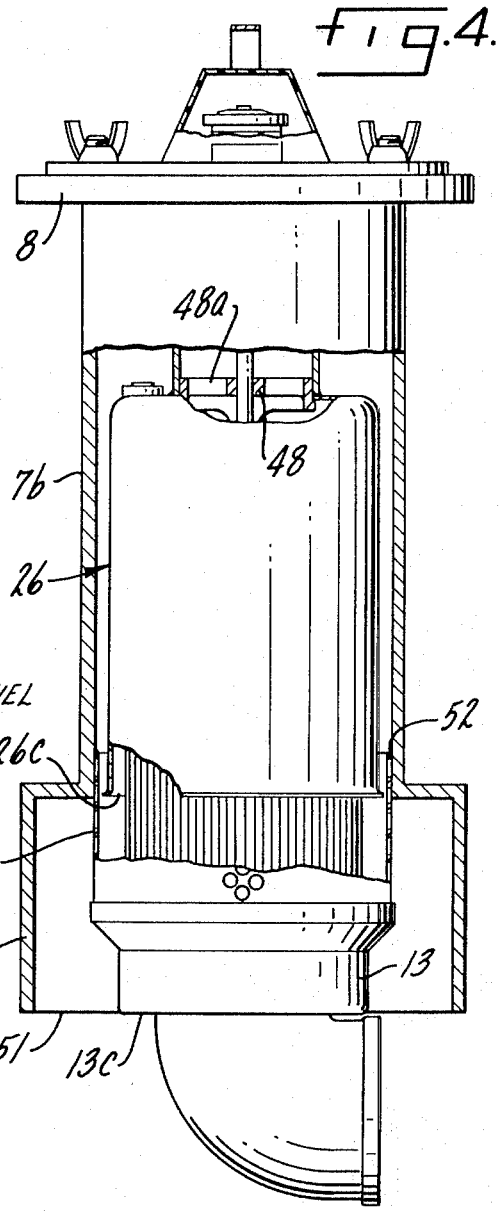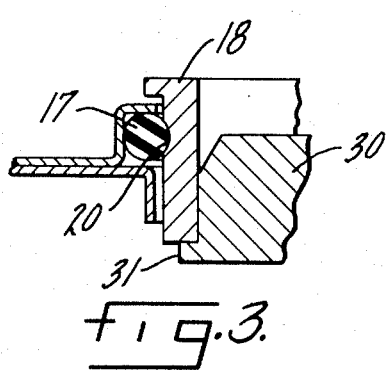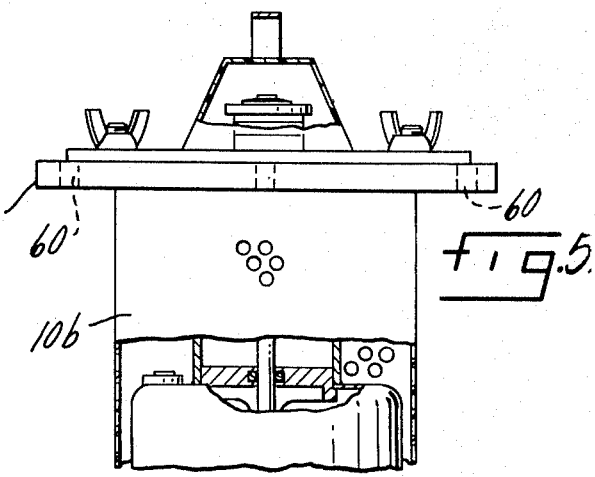

CONTINUOUS FLOW SUCTION FILTER

SUMMARY OF THE INVENTION

This invention relates to filters and particularly to suction filters employed within fluid reservoirs.

One purpose is to provide a suction filter assembly permissive of continuous flow therethrough with a filter element present or absent therefrom.

Another purpose is to provide a suction filter assembly fully effective throughout a wide range of reservoir fluid levels.

Another purpose is to provide a bypassing suction filter assembly including means assuring supply of fluid to a bypass valve located above a reservoir oil level.

Another purpose is to provide a suction filter assembly enabling the removal of a filter element without disturbing the action of the fluid pump and reservoir.

Another purpose is to provide a filter assembly including means effective to preclude air entrapment upon filter element insertion.

Another purpose is to provide a suction filter assembly including means protective of a fluid pump when the filter element is removed.

Another purpose is to provide a filter suction assembly including guide means effective to insure proper insertion of a filter element.

Another purpose is to provide a suction filter assembly having means permissive of installation of a standard assembly in reservoirs of various depths.

Another purpose is to provide an in-reservoir filter assembly in which the filter element thereof need not be positioned entirely beneath the reservoir fluid level.

Another purpose is to provide an in-reservoir suction filter assembly which may be serviced without tools.

Another purpose is to provide a suction filter assembly permissive of uninterrupted machine operation during removal, service and replacement of a filter element of said assembly.

Another purpose is to provide a self priming suction filter assembly for use in reservoirs and the like.

Another purpose is to provide a suction filter assembly mountable inside a reservoir and thus devoid of the need for a conventional filter housing.

Another purpose is to provide a suction filter assembly including means automatically dispositive of entrapped air and preventive of pump cavitation.

Another purpose is to provide a suction filter assembly insuring filtration to full pump flow requirements at reservoir levels below the top of the filter element of the assembly.

Other purposes may appear from time to time during the course of the specification and claims.

BRIEF DESCRIPTION OF THE DISCLOSURE

The invention is illustrated more or less diagrammatically in the accompanying drawings wherein:

FIG. 2 is a side elevation with parts in cross section and on an enlarged scale;

FIG. 3 is a detail view;

FIG. 4 is a view similar to that of FIG. 2 and illustrating a variant form of the invention;

FIG. 5 is a detail view illustrating a variant form of elements of the invention;

Like parts are indicated by like numerals throughout the specification and drawings.

DESCRIPTION OF THE PREFERRED EMBODIMENT

Figure 1:
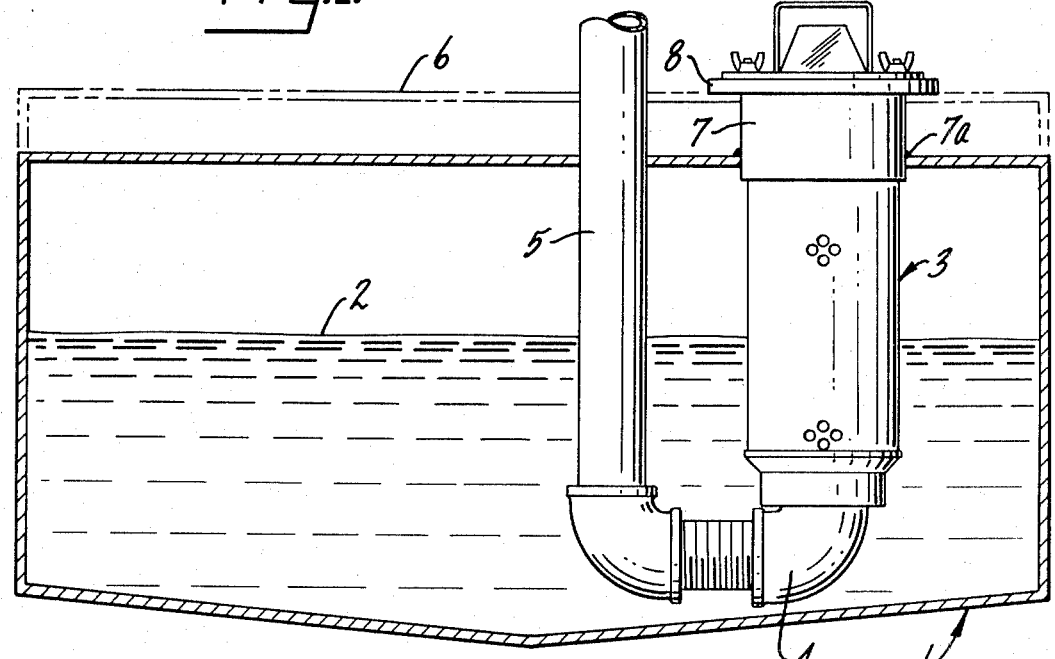
FIG. 1 is a side elevation.

Referring now to the drawings, and particularly to FIG. 1, the numeral 1 generally designates a reservoir. Fluid to be filtered fills the reservoir at varying levels, as indicated at 2. Secured to the upper wall of reservoir 1 is a continuous flow filter housing indicated generally by the numeral 3. The housing 3 communicates at its inner lower end with an outlet fitting 4 positioned adjacent the bottom wall of the housing. Piping 5 is connected to and communicates with the outlet fitting 4 and extends outwardly of the reservoir 1 for communication with an appropriate suction pump (not shown).

As indicated in phantom lines as at 6, the reservoir 1 may vary in depth, a solid metal collar 7 of housing 3 providing for attachment, as by welding for example, of the upper wall of reservoir 1 at any point throughout its length. A flange 8 at the upper edge of collar 7 may seat upon and be welded or bolted to the upper wall of reservoir 1 or the upper wall of reservoir 1 may be secured directly to and at any point along the collar 7 as by appropriate weldments 7a, such as are illustrated in full lines in FIG. 1.

Referring now to FIG. 2, it will be observed that the continuous flow filter housing 3 includes an outer, perforated metal cylindrical wall 10 secured, as by the welds 11 for example, to the collar 7 and extending in axial alignment therewith. Carried at the lower distal end of wall 10 is a imperforate metal collar 12, the reduced cylindrical end portion 13 of which has an inner diameter dimensioned to slidably receive the external surfaces of a filter element 14, collar 12 including a conical portion 13a positioned to guide the same into desired position. Collar 12 includes an upstanding, hollow, central boss element 13b onto which the element 14 moves during its insertion, a seal 15 being carried by element 14 for engagement with the outer circumferential surface of boss 13b. The bottom or end wall 13c of element guide portion 13 seats upon fitting 4 and is provided with circumferentially spaced drain holes 16 for escape of sludge which may accumulate, the filter element 14 terminating in spaced relation with the end wall 13c.

The filter element 14 may be formed of a variety of filtering materials arranged in pleated configuration cylindrically about a perforated metal core 14a. As shown, for example, the filtering material comprises a layer of paper, although a layer or layers of wire mesh may be employed and layers of paper and wire mesh may be superimposed. At the opposite end of the filter element 14 from seal 15, element 14 carries a seal 17 for engagement with a hollow sleeve portion 18. As reflected on an enlarged scale in FIG. 3, the seal 17 is carried in a groove defined by metal plates secured to core 14a and seal 17 is received in an annular groove 20 formed in the external surface of sleeve portion 18 whereby withdrawal of sleeve portion 18 from the housing 3 is effective to carry with it the element 14.

A closure plate or cover 21 is provided for the housing 3 and for seating upon the ring or flange 8, a seal 22 being provided therebetween. A plurality of circumferentially spaced wing nuts 23 engage threaded studs rising through cover 21 from plate 8 and permit disengagement of cover 21 from the plate 8 and sleeve 7 without the use of tools, the plate 8 and collar 7 being suitably joined as by welding, for example. Cover 21 carries the inwardly extending axial sleeve segment 24 to which a solid sleeve 25 is suitably secured as by welding. The inner distal end of sleeve 25 has secured thereto, as for example by welding, a filter shroud 26, the latter taking the form of a thin, imperforate, inverted, cup-shaped metal cylinder having an end wall 26a secured to sleeve 25 and upwardly spaced from element 14, the cylindrical wall 26b of member 26 extending downwardly about and in spaced relation with the element 14 and terminating in the open end 26c spaced upwardly from the lower distal end portion of element 14 and preferably outwardly flared to closely approach perforated housing wall 10.

A bypass valve 30 is slidably received in sleeve portion 18 and carries an annular end flange portion 31 underlying the lower edge of the sleeve as may be best seen in FIG. 3. A rod 32 engages valve member 30 and extends through cover 21 for actuation of an indicator means 33. A spring engages a finger element 35 to urge rod 32 outwardly of cover 21 and thus to urge bypass valve 30 into the closed position in which it is shown in FIGS. 2 and 3. For a more detailed understanding of the indicating means shown in FIG. 2, reference may be had to U.S. Pat. No. 3,342,332, issued Sept. 19, 1967, and entitled "Filter."

Sleeve portion 18 forms a part of a fitting 39 and is integral with a ring portion 40 secured to the inner end of sleeve 25 and clamping the end wall 26a of shroud 26 against sleeve 25, the ring portion 40 being joined to sleeve portion 18 by a spaced leg portion 41 and slidably engaging rod 32.

Indicated at 42 is an automatic purge valve mounted in the end wall 26a of shroud 26, the valve 42 being urged by a spring 43 into closed position precluding passage of air or liquid into shroud 26 and permitting valve 42 to open for flow of air outwardly from within shroud 26 when the filter element structure is inserted into the housing 3.

A handle 45 is secured externally of cover 21 and conveniently overlies the indicator structure 33. A perforated or expanded metal screen 46 is secured across the upwardly open end of element boss 13b.

In the form of the invention illustrated in FIG. 4, the collar 7 of solid imperforate metal of FIG. 2 has been extended in length to a point substantially adjacent and in horizontal alignment with the lower open end 26c of shroud 26, at which point the cylindrical wall member or collar 7b is offset to provide an expanded-diameter, fluid-receiving end portion 50. It will be observed that the lower open mouth of portion 50 is in substantial alignment with the bottom wall 13c of guide element 13, as indicated at 51, and that the inner surface of portion 50 is in spaced relation with guide 13 and with a perforated housing wall 10a, the latter being of substantially less axial extension than that of wall 10 in FIG. 2, the upper portion of the wall 10a being secured to the inner surface of extended collar 7b in any suitable manner as indicated at 52. It will be understood that the cylindrical wall of greater diameter portion 50 could be extended upwardly for securement to mounting plate 8 and an annular plate could be secured to the inner surface of such wall and to the upper portion of member 10a in substantial alignment with the open end 26c of shroud 26 to accomplish substantially the result as that accomplished by the structure of FIG. 4.

In the form of the device illustrated in FIG. 4, the ring 40 takes the form of a central guide 48 for rod 32 having a web or spoke construction and providing passages 48a therethrough.

In the form of the invention illustrated in FIG. 5, the collar 7 has been eliminated and perforated wall 10 has been extended, the wall 10b rising the full length of housing 3 and secured at its upper end to plate 8. With such a structure only the plate 8 will be employed as means for mounting the device of the invention upon the upper wall of a reservoir. Circumferentially spaced bolt-receiving holes 60 are provided in the plate 8 for that purpose for example.

Figure 6:
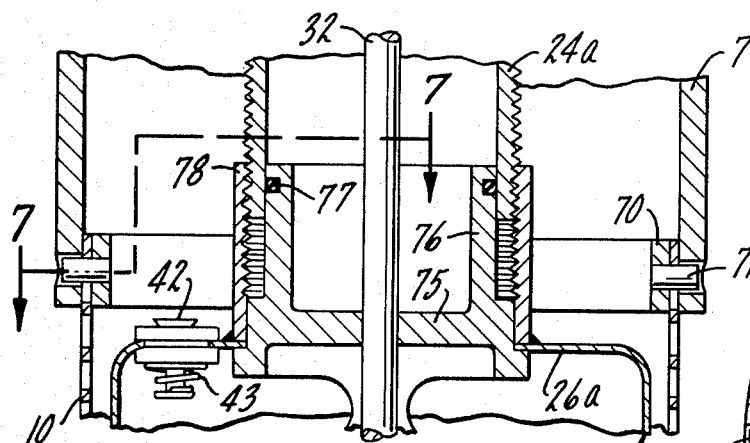
FIG. 6 is a detail view in cross section illustrating a variant form of elements of the invention.
Figure 7:
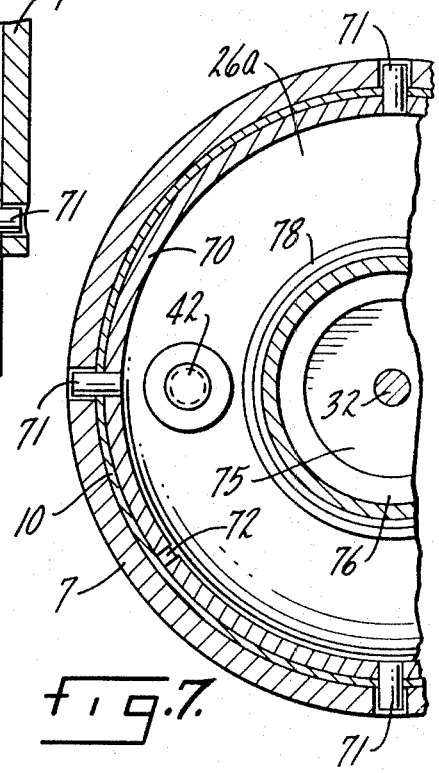
FIG. 7 is a view taken on the line 7—7 of FIG. 6.

Referring now to FIGS. 6 and 7, alternate means are illustrated for securing the wall 10 to collar 7 and for adjustably securing a modified sleeve 24 to a modified ring 40 and to shroud 26.

A positioning ring 70 formed of elastic material, such as spring steel for example, carries circumferentially spaced, radially outwardly disposed pins 71. Mating holes are formed in the upper edge of the wall 10 and in a lower portion of collar 7 for reception of the pins 71 to secure the wall 10 to the collar 7, the ring 70 having a gap 72 for assembly and disassembly as clearly shown in FIG. 7.

In the form of FIG. 6 the modified extension or sleeve 24a is provided with external threads. The modified ring and rod guide 75 includes an upstanding sleeve portion 76 carrying seal 77 for engagement with the inner surface of extension 24a. An inwardly threaded adjusting sleeve 78 is dimensioned for threaded engagement with the extension 24a and for clamping the end wall 26a of shroud 26 to ring 75. It will be realized also that rod 32 may be provided with threads (not shown) for adjustable engagement with bypass valve 30 without departing from the nature and scope of the invention.

Figure 8:
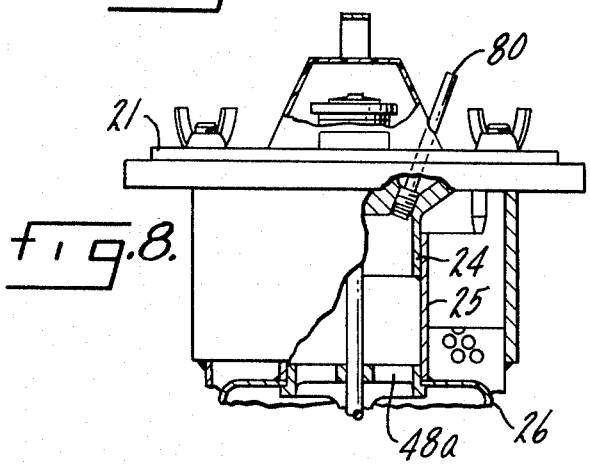
FIG. 8 is a detail view illustrating a variant form of elements of the invention.

In the form of FIG. 8 the purge valve structure has been deleted from its association with shroud 26 and a manually operable purge valve 80 is carried by cap 21, openings 48a being employed in such event to provide for flow of air trapped within the shroud 26 through sleeves 25,24 for escape to atmosphere as the filter element 14 and shroud 26 are inserted in housing 3.

The use and operation of the invention are as follows:

The continuous flow suction filter assembly of the invention is installed, for example, in the manner illustrated in FIG. 1, with the outlet fitting 4 at or adjacent a low point in the reservoir. Collar 7 enables installation of a standard filter assembly of the invention with reservoirs of varying depth. The flowthrough housing 3 is installed, preferably vertically, in the reservoir with flange or ring 8 positioned externally thereof and with fitting 4 adjacent a lowermost portion of the reservoir, the piping 5 communicating the outlet fitting 4 with a suction pump positioned externally of the reservoir.

The invention dispenses with the prior need for insuring that in-reservoir filter elements be positioned entirely beneath the reservoir fluid level.

As illustrated by the arrows in FIG. 2, liquid in the reservoir between the lower cap 12 and collar 7 flows through the perforated housing wall 10. Liquid entering the housing wall 10 above the lower open edge 26c of shroud 26 is shielded from the filter element 14. Some of said liquid may be drawn downwardly along the outer surface of the shroud in the course of fluid flow, it being understood that fluid is drawn through the housing wall 10 and filter element 14 by the suction existing in the outlet fitting 4. Some of the fluid entering housing 10 below shroud 26 will pass through the adjacent portion of the filter element 14 and into the outlet fitting 4. Some of said fluid will also flow upwardly within the shroud 26, to the upper level thereof and above the bypass valve 30 and will flow through upper portions of the filter element 14. Thus virtually the entire filtering area of element 14 will be utilized at all reservoir fluid levels at or above the open end 26c of shroud 26. Should the filter element 14 become clogged beyond a predetermined extent and the resulting pressure differential result in opening of the valve 30, fluid may thus continue to be delivered to the outlet 4 for continuous machine operation.

In the form of FIG. 4 the ability of element 14 to filter fluid over its entire area at even lower reservoir fluid levels may be provided. Such minimum level may, for example, be only slightly above the lower edge of the expanded wall portion 50. The suction created within filter element 14 is effective to draw such fluid upwardly within shroud 26. Thus, even though the fluid in the reservoir be at a minimal level, the entirety of filter element 14 is employable to provide the pump with its flow requirements and to provide for bypassing in the event of a clogged filter element 14.

When it becomes necessary to service or replace the filter element 14, it is only necessary that the operator turn the wing nuts 23 by hand and without special tools and remove the cover or closure 21 from the mounting plate 8. Withdrawal of the cover 21 carries with it the entire filtering structure within housing 3. The engagement with seal 17 in the external groove of sleeve portion 18 serves to insure withdrawal of the filter element 14 with the cover 21. The engagement of bypass valve flange 31 with sleeve portion 18 and of stem 32 with valve 30 and cap 21 insures the withdrawal of fitting 39. The engagement of extension 24 with sleeve 25 and sleeve 25 with shroud 26 insures the withdrawal of these elements with cap 21. The protective expanded metal screen 46 remains in place on outlet fitting 4, thus insuring against accidental delivery of nonfluid items to the pump, which solid articles might otherwise be dropped into the housing 3 while the filter element is absent therefrom. Similarly, the pump may continue to operate and the operation of machinery remain interrupted even though the filter element is absent, the fluid in the reservoir being drawn through the perforated wall 10 and screen 46 for delivery to the pump.

Replacement of the filtering assembly in housing 3 is easily and simply accomplished, the operator merely grasping handle 45 of cap or closure 21 with the elements attached, as shown in FIGS. 2 or 4, and inserting the same into the housing 3 of FIG. 2 or into the structure 7a,50 of FIG. 4. With such insertion air will be trapped in shroud 26. The automatic purge valve 42, however, will open in response to such entrapment to purge the air from the shroud 26 as the cap 21 is brought into place on plate 8. As the filter element 14 approaches the fitting 4 the filter element guide 13 with its inclined upper portion 13b serves to guide the filter element into position for engagement with the filter element boss 13b and the inner wall surface of cap portion 13.

Thus the filtering structure may be removed and replaced without interruption of the operation of machinery dependent on fluid from the reservoir and while the pump is, in fact, drawing fluid through the perforated wall 10 or 10a. No requirement exists for the operator reaching into the fluid to seek and remove a submerged filter element. With the cap 21 removed, the old filter element may be easily and simply snapped off the sleeve 18 and a new element snapped into place with a new seal 17 engaging the groove in sleeve 18.

With removal of entrapped air from shroud 26 through the mediacy of valve 42 or valve 80, the filter of the invention is self-priming and the requirement for draining the filter is eliminated. The dispensing of air from shroud 26 further insures against pump cavitation and insures the drawing of fluid upwardly into shroud 26 for employment of element 14 in its entirety even at low reservoir levels.

Assembly of the perforated wall 10 with collar 7 may be accomplished without welding and the assembly and disassembly thereof may be facilitated by the elastic positioning ring 70 with its pins 71, as illustrated in FIGS. 6 and 7. Similarly, the cap 21 may be adjustably associated with shroud 26 and bypass valve 30, as illustrated in FIG. 6.

In FIG. 8 a manually operable purge valve is associated with cap 21 and the purge valve 42 is deleted from shroud 26, the manual purge valve 80 being operated by the operator as cap 21 is placed on mounting plate 8 to insure escape of all trapped air within shroud 26 and between shroud 26 and cap 21.

The embodiments of the invention in which an exclusive property or privilege is claimed are defined as follows:

1. In a suction filter assembly for reservoirs and the like, mounting means formed and adapted for securing to and externally of the wall of a reservoir, an elongated, cylindrical, perforated metal housing wall carried by said mounting means and extending into said reservoir, an outlet fitting in said reservoir and adjacent the inner end of said perforated housing wall and means communicating said outlet fitting with a source of suction externally of said reservoir, a closure plate formed and adapted for removable engagement with said mounting means externally of said reservoir and in sealing engagement with said mounting means, a filter element carried by said closure plate for positioning within said perforated housing wall and between said housing wall and said outlet fitting when said closure plate is in said engagement with said mounting means, and a shroud formed of imperforate material and comprising a chamber with a first closed end supported by said closure plate, a second open end surrounding an end portion of said filter element adjacent said outlet fitting, and side walls spaced inwardly of said perforated housing wall and outwardly of said filter element.

2. The structure of claim 1 wherein said mounting means is secured to the upper wall of said reservoir, said perforated housing wall extends substantially vertically downwardly into said reservoir, said outlet fitting is positioned adjacent the lowermost wall of said reservoir and said shroud encloses the major upper portion of said filter element.

3. The structure of claim 1 characterized by and including a purge valve carried by said shroud and automatically openable to expel air from within said shroud.

4. The structure of claim 1 characterized by and including a purge valve carried by said cover plate.

5. The structure of claim 1 characterized by and including an imperforate, tubular collar secured to and between said mounting means and said perforated wall in axial alignment with said mounting means and perforated wall.

6. The structure of claim 1 characterized by and including a cylindrical, elongated, imperforate wall secured to said mounting means and extending into said reservoir, said imperforate wall having an enlarged distal open end portion adjacent said outlet, said perforated wall, shroud and filter element being removably received within said wall and end portion.

7. The structure of claim 6 wherein said perforated wall extends the length of said imperforate end portion and is secured to said imperforate wall and said shroud extends within said imperforate wall to a point adjacent said imperforate wall end portion.

8. The structure of claim 1 characterized by and including an imperforate end cap secured to the distal end of said perforated wall and having inclined and tubular guide portions adapted for guiding and receiving engagement with the inner end of said filter element.

9. The structure of claim 1 characterized by and including a bypass valve structure carried by said closure plate and positioned for communication with the area within said filter element, said shroud extending across and in spaced relation with said bypass valve structure.

10. The structure of claim 1 characterized by and including an axially positioned hollow boss carried by and within the distal end of said perforated wall for reception of said filter element in slidable engagement therewith, said boss communicating with said outlet fitting.

11. The structure of claim 1 characterized by and including a screen fixed over said boss and adapted to screen said outlet when said filter element is absent.

12. The structure of claim 1 characterized by and including purge valve means mounted on said closure plate and sleeve elements between said closure plate and said shroud and communicating said purge valve means with the area within said shroud.

13. The structure of claim 5 characterized by and including alignable, circumferentially spaced apertures in said collar and said perforated wall and an elastic, expandable ring having radially directed pins formed and adapted for reception in said apertures to removably secure said perforated wall to said collar.

14. An in-reservoir filter assembly including a fluid receiving housing fixed in a wall of a reservoir and extending thereinto and a filtering assembly removably positionable in said housing, said assembly including a closure plate for the outer end of said housing, an imperforate, cup-shaped shroud carried by said closure plate for positioning in said housing and a filter element carried by said closure plate, said filter element having at least its major portion positioned within and in spaced relation with said shroud, said shroud comprising a chamber with a first closed end supported by said closure plate, a second open end surrounding an end portion of said filter element, and side walls spaced inwardly of said perforated housing wall and outwardly of said filter element, and automatic purge valve means mounted in an end wall of said shroud and adapted to transmit air from within said shroud.

15. The structure of claim 14, characterized by and including bypass valve means between the area within said shroud and the area within said filter element, said bypass valve means being positioned above the level of fluid in said reservoir and openable in automatic response to clogging of said filter element and delivery of fluid from said level and upwardly through said shroud.

* * * * *